(12) United States Patent
Sfez

(10) Patent No.: US 7,113,682 B2
(45) Date of Patent: Sep. 26, 2006

(54) LITHOGRAPHICALLY BUILT OPTICAL STRUCTURES

(75) Inventor: Bruno Sfez, Jerusalem (IL)

(73) Assignee: Soreq Nuclear Research Center, Nahal Soreq (IL)

( * ) Notice: Subject to any disclaimer, the term of this patent is extended or adjusted under 35 U.S.C. 154(b) by 0 days.

(21) Appl. No.: 10/922,899

(22) Filed: Aug. 23, 2004

(65) Prior Publication Data

US 2005/0047741 A1    Mar. 3, 2005

(30) Foreign Application Priority Data

Aug. 28, 2003    (IL) .................................. 157635

(51) Int. Cl.
*G02B 6/10* (2006.01)
(52) U.S. Cl. ..................... 385/129; 385/141
(58) Field of Classification Search ........ 385/123–128, 385/141–146
See application file for complete search history.

(56) References Cited

U.S. PATENT DOCUMENTS

| | | | | |
|---|---|---|---|---|
| 6,072,926 A | * | 6/2000 | Cole et al. ..................... | 385/37 |
| 6,788,864 B1 | * | 9/2004 | Ahmad et al. .............. | 385/123 |
| 2001/0026667 A1 | * | 10/2001 | Kawanishi et al. ......... | 385/125 |
| 2005/0089262 A1 | * | 4/2005 | Jenkins et al. ................ | 385/14 |

* cited by examiner

*Primary Examiner*—Sung Pak
*Assistant Examiner*—Tina M. Wong
(74) *Attorney, Agent, or Firm*—Dekel Patent Ltd; David Klein

(57) ABSTRACT

Optical apparatus including an optical waveguide including a hollow core formed lithographically. The optical waveguide may include a cladding with a reflective surface deposited thereon. The reflective surface may include a metallic coating, a multilayer dielectric coating, a multi-dimensional photonic crystal, and/or may be doped with a lasing material. The multilayer dielectric coating may include only dielectric layers or a combination of dielectric and metal layers.

3 Claims, 5 Drawing Sheets

LITHOGRAPHICALLY BUILT OPTICAL STRUCTURES

FIELD OF THE INVENTION

The present invention relates generally to fabricating optical fibers and waveguides, such as but not limited to, laser fibers and photonic crystal fibers, and particularly to fabricating optical fibers and waveguides with lithographic techniques.

BACKGROUND OF THE INVENTION

Optical fibers often have a circular section while waveguides often have a rectangular section. One of the main reasons for this is that optical fibers are manufactured by melting a preform, and the circular geometry is most adapted for this manufacturing process. Manufacturing optical fibers by melting a preform is suitable for making long fibers, especially for telecommunications.

However, there are more and more cases where fibers are not sought for the long distance transport ("extra-muros"), but rather for short distances ("intra-muros", up to a few meters). In that case, the circular section is not mandatory. However, very special properties are required from such fibers. These properties include but are not limited to:

a. transport of very highly energetic laser sources
b. lasing action within the fiber
c. coupling with several sources
d. light transport in the infra-red
e. polarization maintaining/Bragg wavelength selection/DFB lasing In order to obtain such properties, fiber designs have been proposed in the prior art. One proposal is to replace the traditional index guiding with guiding through engineered reflections ("Theory of Bragg fiber", P. Yeh, A. Yariv and E. Marom, JOSA 68, 9, 1978). This engineering may be optimized so that complete reflection at every angle is possible. In such a case, it is possible to fabricate an air-core fiber, allowing high energies to propagate in the fiber ("Wavelength-scalable hollow optical fibres with large photonic bandgaps for $CO_2$ laser transmission", B. Temelkuran, S. D. Hart, G. Benoit, J. D. Joannopoulos and Y. Fink, Nature, vol 420, December 2002, page 650). In order to do so, a possibility is to cover the cladding wall with an omnidirectional mirror. In "Omnidirectional multilayer device for optical waveguiding", Fink et al., PCT patent application WO 00/22466, such a multilayer is realized using a polystyrene-chalcogenide multilayer coating.

In "High index-contrast fiber waveguides and applications", Anderson et al, PCT patent application WO 02/084362, such a coating is obtained by using very specific material compositions at very specific conditions in order to match both the optical properties and the mechanical properties between the two materials of the multilayer, which is needed in order to extrude the fiber.

In "Dielectric waveguide with transverse index variation that support a group velocity mode at a non-zero longitudinal wavevector" PCT patent application WO 02/43180, a photonic crystal fiber laser structure is proposed, based on zero-velocity modes. However, it does not show how to efficiently couple light in the photonic crystal fiber.

Another possibility is to create an array of holes that constitutes either a full photonic crystal or at least a strong guiding through a lower refractive index ("A photonic crystal fiber and a method for its production", Russel et al, PCT patent application WO 00/60388). Such structures are also well suited for lasing action. However, like in the preceding case, coupling the pump to the fiber may be done only through the fiber end (end-pumping) or the side (side pumping), as in "Photonic crystal fibre guiding a first mode and a pump beam", Russel et al, PCT patent application WO 01/42829.

All the methods currently used are based on drawing fibers, which places stringent conditions on the materials that are used. Moreover, these drawing techniques lead to fibers that do not allow simple optical pumping if several pumping beams must be used.

SUMMARY OF THE INVENTION

The present invention seeks to provide an improved and novel method for fabricating fibers and laser fibers, as is described more in detail hereinbelow.

Throughout the specification and claims, the terms "waveguide" and "fiber" are used interchangeably to denote any passage for electromagnetic wave energy.

In an embodiment of the present invention, a lithographic technique may be used to fabricate fibers and laser fibers. The technique may include fabricating junctions, coupling pump laser light through the junctions to fiber cladding, pumping the cladding and stimulating emission of light in the core through population inversion in the cladding.

In an embodiment of the present invention, two half waveguides are formed and bonded together. The half waveguides themselves may be created using a lithographic process on, for example, a glass or a polymeric substrate. Being a half waveguide, the core is open to the air and therefore complex treatments may be performed. Using the lithographic process enables coupling light inside such a waveguide using the directional coupler effect (through an evanescent wave). A multilayer mirror may be deposited in the open fiber, and designed such that it is transparent for the pump and reflecting for the laser wavelength. Other elements, such as nonlinear crystals, may also be introduced in order to provide additional functionalities (such as frequency doubling, parametric oscillation and so on).

There is thus provided in accordance with an embodiment of the present invention optical apparatus including an optical waveguide including a hollow core formed lithographically.

In accordance with an embodiment of the present invention the optical waveguide includes a cladding with a reflective surface deposited thereon. The reflective surface may include a metallic coating, a multilayer dielectric coating, a multi-dimensional photonic crystal, and/or may be doped with a lasing material. The multilayer dielectric coating may include only dielectric layers or a combination of dielectric and metal layers.

Further in accordance with an embodiment of the present invention the lasing material includes at least one of rare-earth atoms, a dye, and quantum dots.

Still further in accordance with an embodiment of the present invention the optical waveguide includes two half-waveguides manufactured lithographically and attached to one another.

In accordance with an embodiment of the present invention a device is provided for coupling light inside the core. The device may be a directional coupler and/or a Y junction.

Further in accordance with an embodiment of the present invention the reflective surface reflects laser light of the optical waveguide.

Still further in accordance with an embodiment of the present invention Bragg gratings may be at ends of the optical apparatus.

In accordance with an embodiment of the present invention a nonlinear crystal may be inside the optical waveguide.

There is also provided in accordance with an embodiment of the present invention a method for manufacturing optical apparatus including lithographically forming an optical waveguide including a hollow core.

In accordance with an embodiment of the present invention the method further includes lithographically forming two half-waveguides and attaching them to one another to form the optical waveguide. The two half-waveguides may be bonded together or attached together by deposition.

Further in accordance with an embodiment of the present invention the lithographically forming includes depositing a photoresist layer on a substrate, and illuminating the substrate through a mask to etch a waveguide profile. Alternatively, the lithographically forming includes directly writing a waveguide profile on a substrate using a focused laser. The mask may have a spiral shape.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
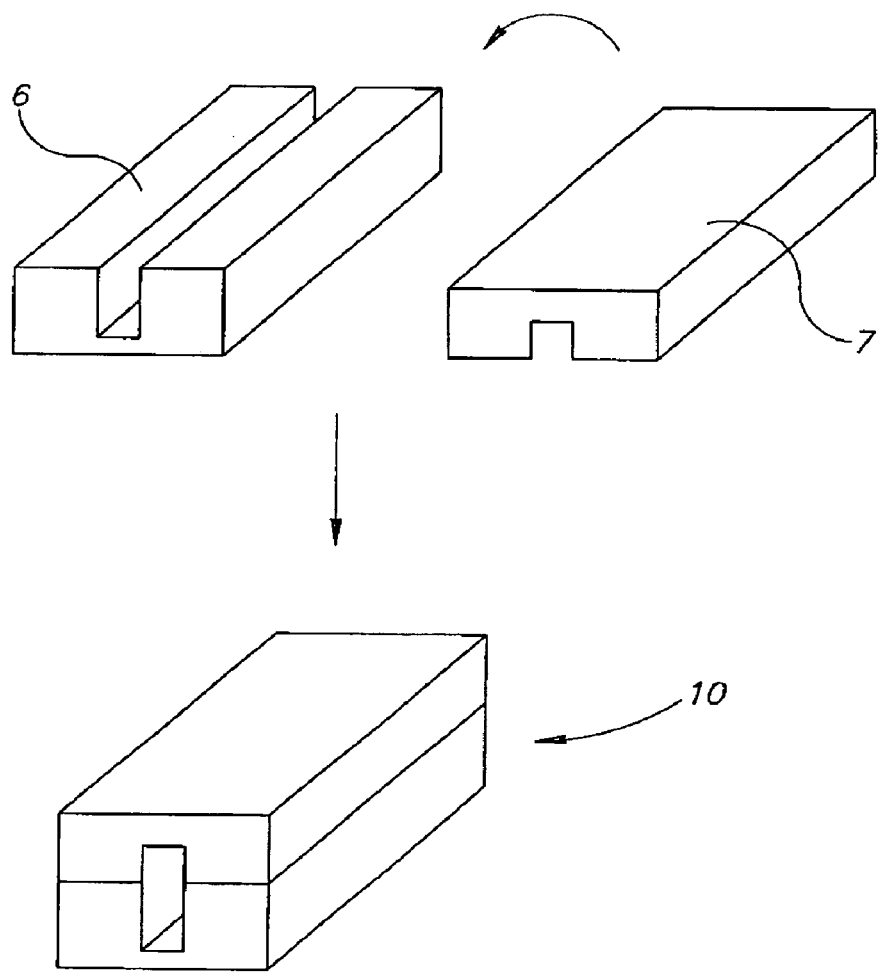
FIG. 1 is a simplified illustration of a two-step fabrication of a hollow waveguide or optical fiber, in accordance with an embodiment of the present invention.

Reference is now made to FIG. 1, which illustrates a two-step fabrication of a hollow waveguide or optical fiber, in accordance with an embodiment of the present invention.

Two half-waveguides 6 and 7 may be manufactured by a lithographic process as is described hereinbelow. The two half-waveguides 5 and 7 may then be attached to one another to form a complete waveguide 10, such as by bonding or deposition, for example, as is described hereinbelow.

Figure 2:
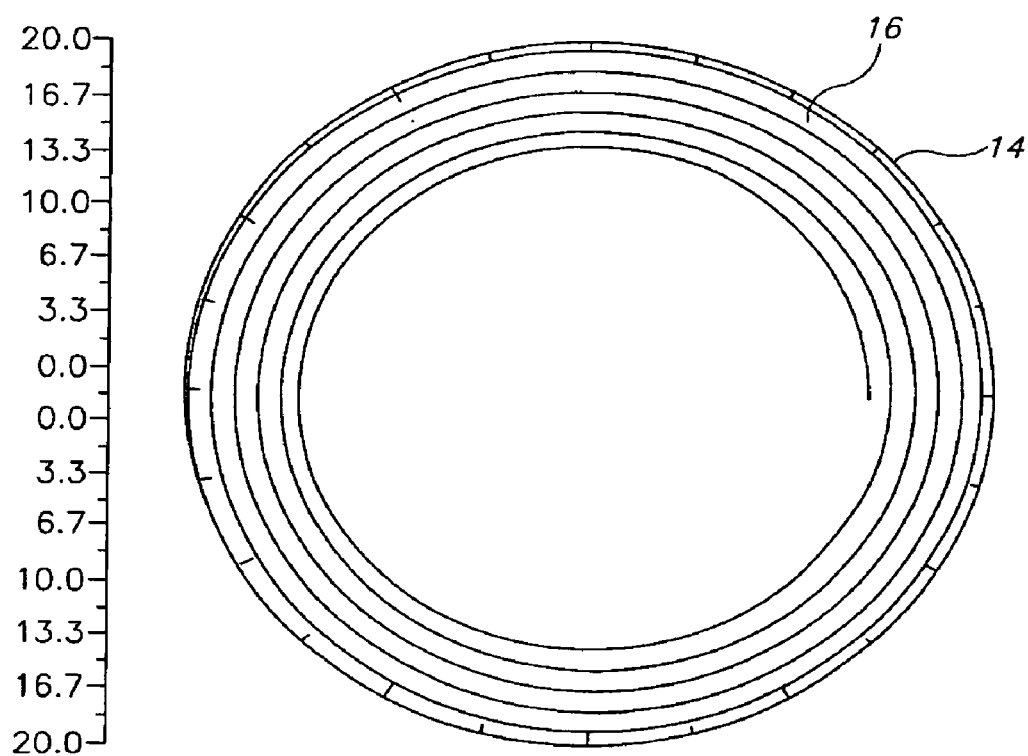
FIG. 2 is a simplified illustration of a geometrical configuration of a mask for manufacturing the hollow waveguide in a standard bell jar deposition system (spiral), in accordance with an embodiment of the present invention.

Referring to FIG. 2, a thin photoresist layer 14 may be deposited, such as but not limited to, by means of spin-coating, on a polymeric substrate 16. The substrate 16 may be illuminated through a mask (not shown) in order to etch a waveguide profile. A pattern can be also directly written using a focused laser. A long deposition chamber may be used for linear geometry, that is, to deposit layer 14 on a relatively long substrate 16. Alternatively, in order to save room in the deposition chamber, the mask may have a spiral shape (Swiss roll) as shown on FIG. 2.

Figure 3:
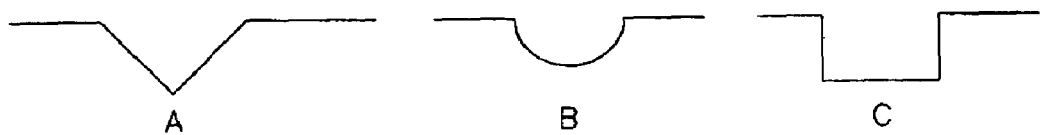
FIG. 3 is a simplified illustration of different possible profiles of the fiber cross-section, in accordance with embodiments of the present invention.

Non-limiting examples of waveguide profiles a, b and c obtained after etching are shown in FIG. 3. The invention is not limited to these profiles, and other profiles may be chosen in order to improve a specific characteristic, examples of which are described hereinbelow. Another alternative is to obtain a relief shape (e.g., rib waveguide), which may be used as a mold. In such a manner, sol-gel hollow waveguides may be easily prepared.

Figure 4:
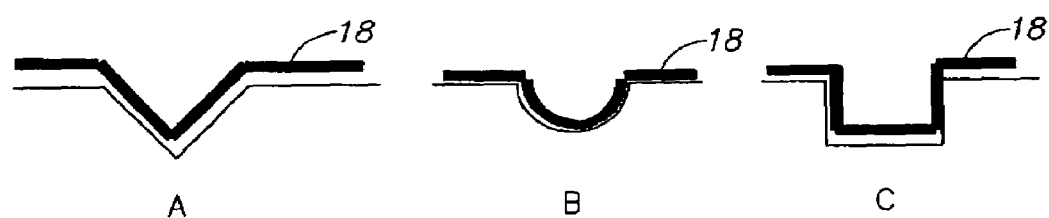
FIG. 4 is a simplified illustration of profiles of the fiber cross-sections after deposition of a reflective surface, in accordance with an embodiment of the present invention.

The next step in the process is deposition of a reflective surface on the cladding of the waveguide or fiber. Reference is now made to FIG. 4, which illustrates profiles a, b and c of cross-sections after deposition of a reflective surface 18, in accordance with embodiments of the present invention.

On example of deposition of reflective surface 18 comprises deposition of a multilayer in order to form a Bragg fiber. The multilayer may comprise, without limitation, Chalcogenide glasses (AsS, AsSe, AsSSe, AsSeTe and so on) and polymers (PES, PMMA and so on). These materials have a similar deposition temperature and are therefore compatible in the deposition process. However other materials may be used, such as polysilicon and silica and so on. In order to reduce the number of dielectric layers, a thin metallic coating can be deposited first, so that the dielectric coating is surrounded by the metallic coating.

Another example of deposition of reflective surface 18 comprises deposition of a photosensitive material and direct writing (by lithography) of a three-dimensional photonic crystal. Yet another example of deposition of reflective surface 18 comprises deposition of a metallic coating, although losses may be greater than for a dielectric coating.

Figure 5:
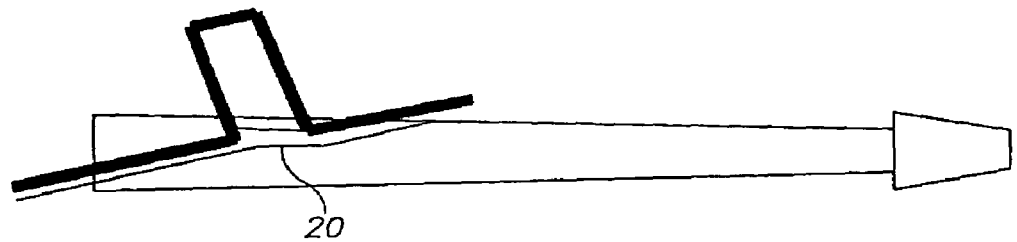
FIG. 5 is a simplified illustration of an oblique incidence deposition technique in order to close the hollow waveguide, in accordance with an embodiment of the present invention.

The next step in the process is forming a "cover" on top of the waveguide or fiber. FIG. 5 illustrates one possibility, wherein a cover 20 is formed by deposition (or evaporation) of a cover material at a strong oblique incidence. This creates a "roof" that allows further deposition of other materials, if desired.

Figure 6:
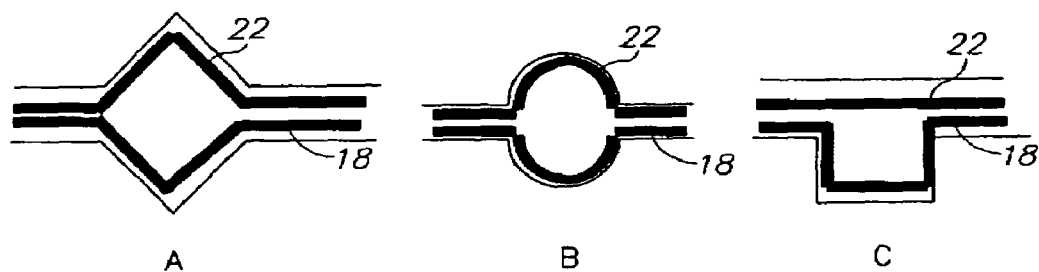
FIG. 6 is a simplified illustration of closing the different fiber profiles, in accordance with an embodiment of the present invention.

FIG. 6 illustrates another possibility, wherein a cover 22 is bonded (e.g., glued) on the waveguide or fiber. The oblique deposition method of FIG. 5 may be better for forming small waveguides, whereas the bonding method of FIG. 6 may be better for larger waveguides. Bonding the two parts of the device may possibly lead to losses at the junction. These losses will probably be larger if the fiber is multimode than monomode.

After the cover is in place, the waveguide or fiber may be cut to size. For example, the spiralized waveguide of FIG. 2 may be cut at any point. The cut may be done mechanically, chemically or by any other methods.

A jacket may be formed over the cut fiber or waveguide, such as but not limited to, by immersion in a liquid polymer (or monomer) that solidifies (or polymerizes) to form the jacket.

In accordance with different embodiments of the present invention, structures of any complexity may be created within the waveguide or fiber. Some examples will now be described, although the invention is not limited to these examples.

Figure 7:
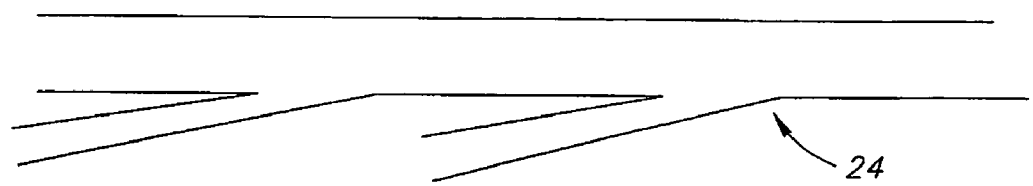
FIG. 7 is a simplified illustration of waveguide Y junctions for coupling pump light into the fiber, in accordance with an embodiment of the present invention.

For example, it is possible to couple light inside such a waveguide using the directional coupler effect (through evanescent wave). The mask may be lithographically prepared so that a directional coupler is formed. One example of coupling is by creating an adiabatic Y junction 24 as shown in FIG. 7. In the latter case, several diodes (or lasers) may be coupled into the fiber. It should be noted that such a complex structure may be formed by lithography and therefore is not more difficult to fabricate than a simple fiber.

As another example, Bragg mirrors may be easily fabricated since before closing the structure, the core is directly accessible. By covering the interior of the cladding with a photosensitive material, it is possible to create a grating inside the core by simply lithographically writing such a grating. If etching is performed, the strong dielectric/air contrast enables obtaining a strong Bragg effect, although only the evanescent wave is affected.

As yet another example, an optical parametric oscillator (OPO) may be fabricated. Since the core is open, it is possible to include a nonlinear crystal in order to obtain second or third harmonic directly inside the fiber. It is also possible to generate higher wavelengths by combing nonlinear crystals (lasing and second harmonic generation). The nonlinear crystal may comprise, without limitation, potassium tetanal phosphate (KTP), potassium tetanal arsenate (KTA), lithium niobate ($LiNbO_3$), potassium niobate ($KNbO_3$), silver gallium selenite ($AgGaSe_2$), and silver gallium sulfide ($AgGaS_2$), BBO ($BaB_2O_4$), LBO (lithium triborate—$LiB_3O_5$), CLBO (cesium lithium borate—$CsLiB_6O_{10}$), CBO (cesium borate), SBBO (strontium beryllium borate), rubidium tetanal phosphate (RTP), rubidium tetanal arsenate (RTA), cesium tetanal arsenate (CTA), KNB ($KNbB_2O_6$), RNB ($RbNbB_2O_6$), KBBF ($KBe_2BO_3F_2$), $LiIO_3$, periodically poled KTP, periodically poled RTA, periodically poled $LiNbO_3$, periodically poled $LiTaO_3$ and/or other non-linear crystals.

In accordance with an embodiment of the present invention, a laser may be fabricated from the waveguide or fiber. Dielectric mirrors (reflective surfaces) may be directly pumped over the length of the fiber, while the energy at the emission wavelength couples into the waveguide itself. The mirrors may reflect only the laser light wavelength of the waveguide, but not the pump wavelength. The end mirrors may be made out of Bragg mirrors, as described above.

Figure 8:
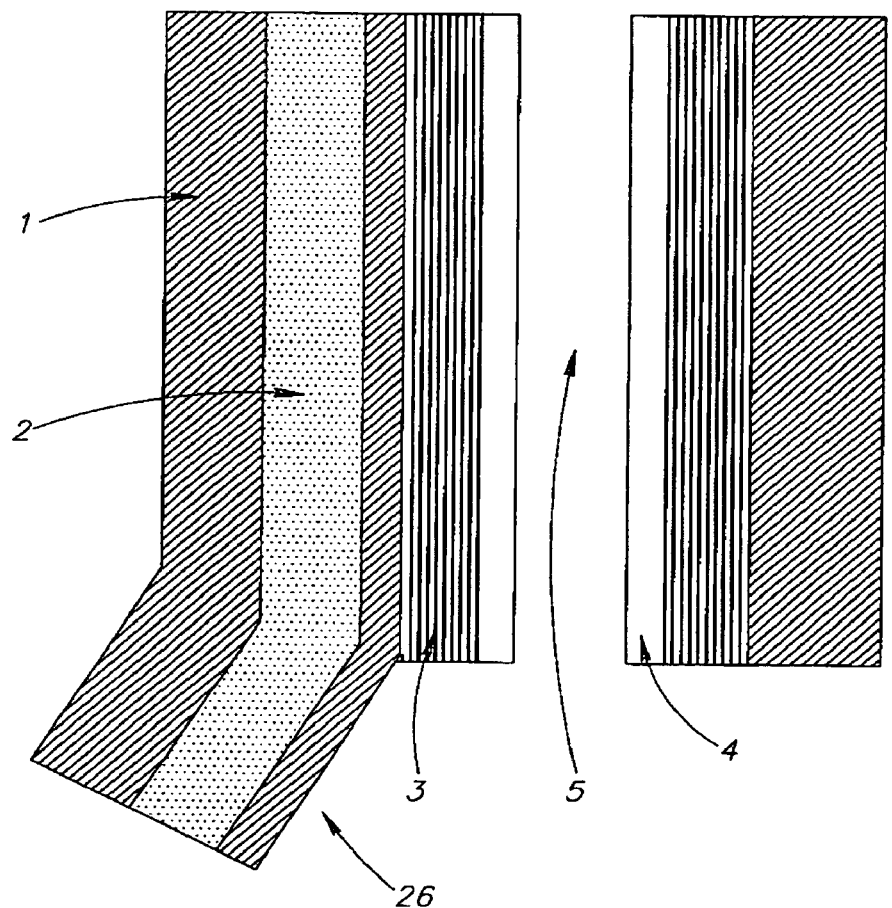
FIG. 8 is a simplified illustration of a hollow fiber laser, in accordance with an embodiment of the present invention.

Reference is now made to FIG. 8, which illustrates a hollow fiber laser, in accordance with an embodiment of the present invention.

In this schematic view, elements 1 to 5 are made of materials with indices n1 to n5, with n5=1 (air or gas), with n1<n2, n3, and n3<n4. n3 is the effective refractive index of the element 3. The principle is the following. Pump light at wavelength $\lambda_P$ is coupled through element 2 (which is a waveguide) and propagates therein until reaching an interaction region 26. In the interaction region 26, light may couple into a waveguide formed by elements 3, 4 and 5. The interaction region 26 may be doped with a suitable lasing material so that population inversion may occur under strong enough pumping. Light at the laser wavelength $\lambda_L$ may be coupled into element 5. Element 3 may be made of a photonic crystal at the wavelength $\lambda_L$ that prevents laser light from escaping out of element 3. The size of the waveguide may be made such that element 5 is monomode (or that only a few number of modes are present) and only the evanescent wave is present in elements 3 and 4. Elements 3 and/or 4 may be doped (e.g., rare-earth atoms, dye, quantum dots and the like). Accordingly, amplification of the laser light may occur in the evanescent tail of the laser light. If mirrors are placed at the ends of the fiber, direct laser action may be obtained.

This laser may be fabricated using the different techniques described above.

In another embodiment, a semiconductor wafer may be used as the substrate 16 (FIG. 2) instead of glass, and etching of the desired air channel may be obtained using standard masking and etching processes. Then, a multilayer coating may be deposited isotropically, for example using plasma deposition, thereby obtaining a coated air channel.

In order to confine light inside this channel, the channel may be closed by bonding (or otherwise attaching) a different coated wafer on top of the channel, or by filling the channel with a multilayer.

Figure 9:
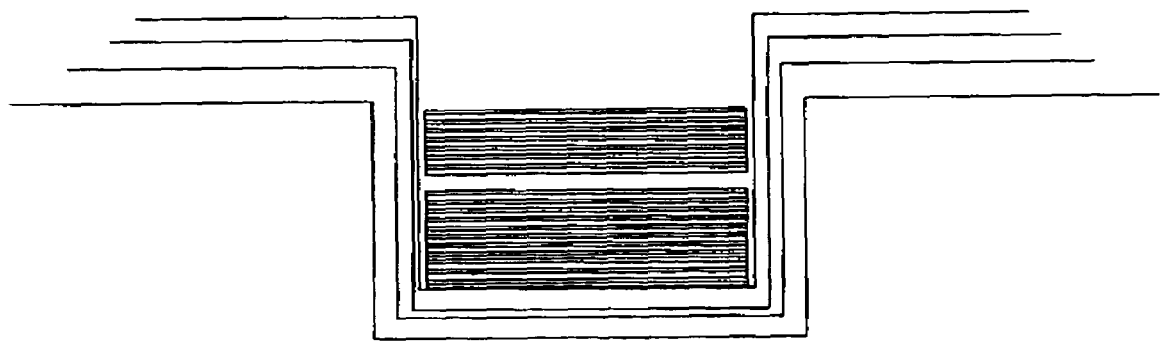
FIG. 9 is a simplified illustration of a photonic crystal waveguide in a semiconductor wafer, in accordance with an embodiment of the present invention.

In the multilayer case, the deposition may not be isotropic but directional (for example thermal or electron beam deposition). A multilayer structure is shown in FIG. 9, which illustrates a photonic crystal waveguide 30 in a semiconductor wafer, in accordance with an embodiment of the present invention. The waveguide 30 may comprise horizontal layers 32, which may be all-dielectric layers or dielectric-metal layers.

In the case of all-dielectric layers, the wave that propagates in the multilayer is a surface wave. In the case of dielectric-metal layers, the wave that propagates in the multilayer is a plasmon polariton wave. In both cases, light is confined in both directions by a multilayer structure. One of the advantages of such a structure is that it is relatively easy to modulate light since the surface wave is particularly sensitive to slight modifications of the surface.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. Optical apparatus comprising:
an optical waveguide including a hollow core formed lithographically, wherein said optical waveguide comprises a cladding with a reflective surface deposited thereon and wherein said reflective surface is doped with a lasing material, said optical waveguide comprising first and second optical waveguides;
wherein said first optical waveguide has a first outer layer with a refractive index n1 and a core with a refractive index n2; and
said second optical waveguide has a first outer layer with a refractive index n3, a second outer layer with a refractive index n4 and a core comprising a gas with a refractive index n5, wherein pl<n2, n1<n3, and n3<n4;
said first and second optical waveguides being arranged with one another such that pump light at a wavelength $\lambda_P$ is capable of coupling through the core of said first optical waveguide and propagating therein until reaching an interaction region, wherein at said interaction region, said light couples into said second optical waveguide, said interaction region being doped with said lasing material so that population inversion occurs under sufficient pumping, and such that light at a wavelength $\lambda_L$ is capable of coupling into the core of said second optical waveguide, wherein the first outer layer of said second optical waveguide is constructed of a photonic crystal at the wavelength $\lambda_L$ that inhibits laser light from escaping therefrom.

2. The optical apparatus according to claim 1, wherein the core of said second optical waveguide is monomode and only an evanescent wave is present in said first and second outer layers of said second optical waveguide.

3. The optical apparatus according to claim 2, wherein said first and second outer layers of said second optical waveguide are doped with at least one of rare-earth atoms, dye, and quantum dots.

* * * * *